Oct. 19, 1954 H. N. WAGAR 2,691,811
METHOD OF PRODUCING IMPROVED LEAD-OUT
CONDUCTORS FOR ELECTRICAL COILS
Filed Aug. 9, 1949 3 Sheets-Sheet 1

INVENTOR
H.N. WAGAR
BY
ATTORNEY

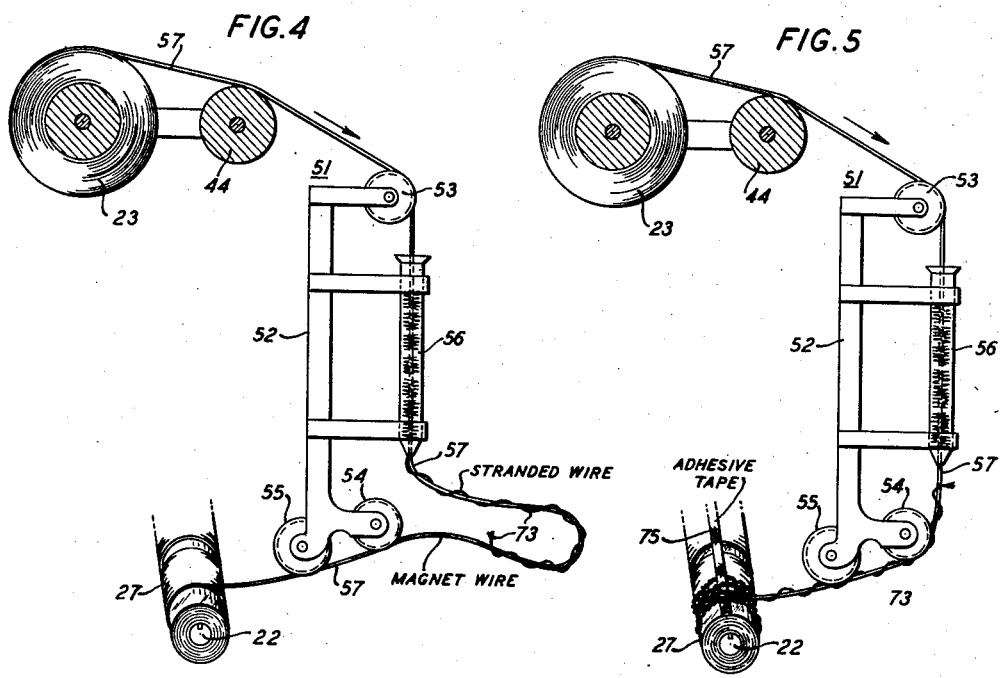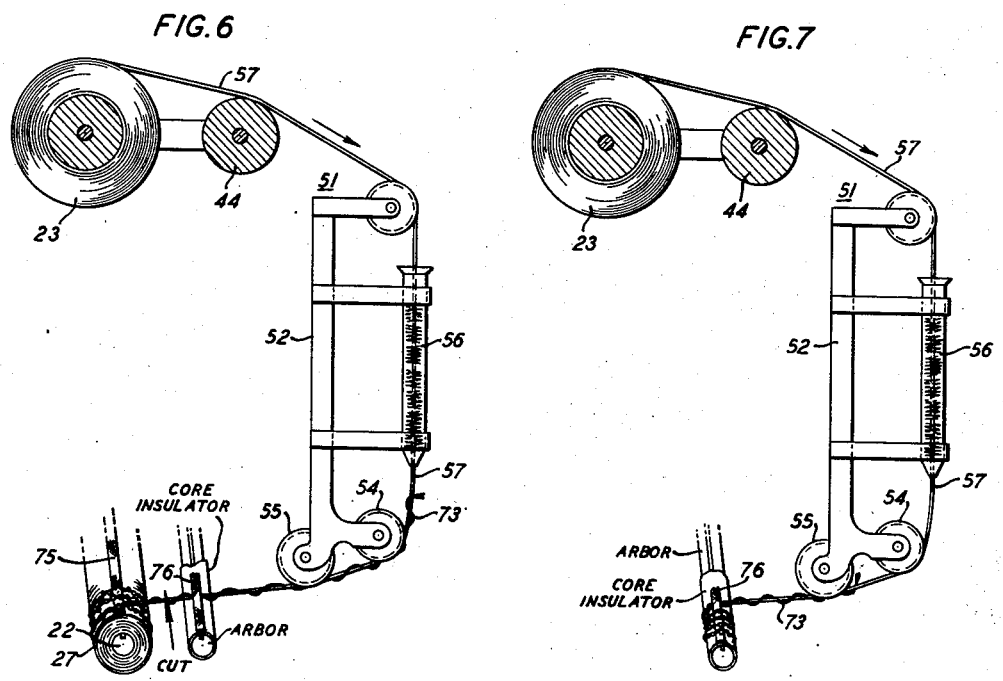

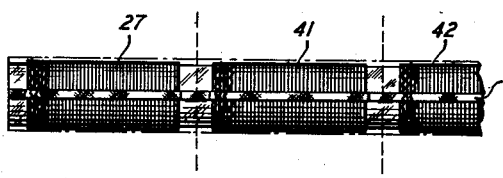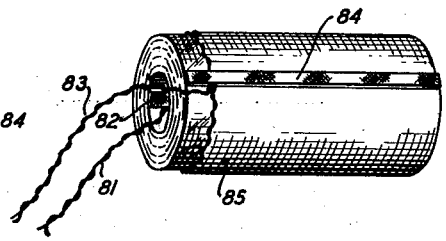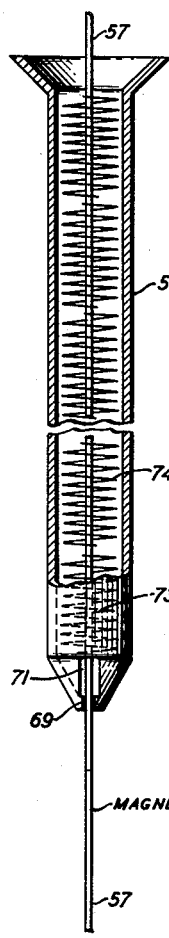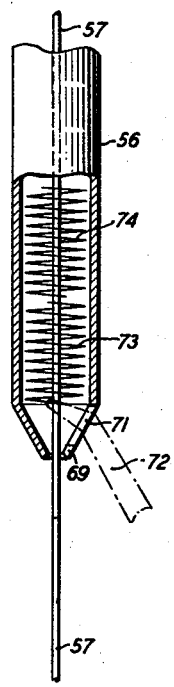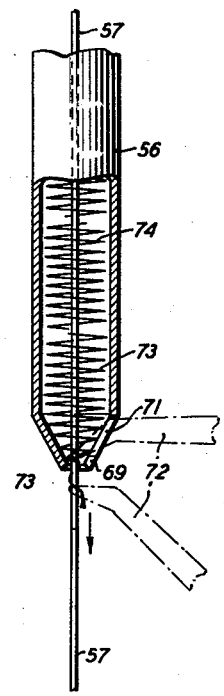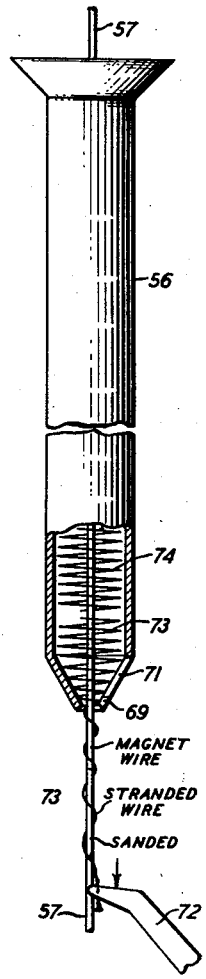

Patented Oct. 19, 1954

2,691,811

UNITED STATES PATENT OFFICE 2,691,811

METHOD OF PRODUCING IMPROVED LEAD-OUT CONDUCTORS FOR ELECTRICAL COILS

Harold N. Wagar, Madison, N. J., assignor to Bell Telephone Laboratories, Incorporated, New York, N. Y., a corporation of New York Application August 9, 1949, Serial No. 109,374

2 Claims. (Cl. 29—155.57)

This invention relates to methods of winding an electrical coil and more particularly to methods of and apparatus for producing lead-out conductors for such coils.

It has long been recognized that one of the weakest points in the construction of an electrical coil utilizing magnet wire is adjacent or at the terminals where the delicate lead-out wire is brought from the ends of the coil to some type of connection. When the finer sizes of wire are utilized, the hazards of handling and operation render this portion particularly susceptible to breakage and when, as for example in the instance of electromagnetic telephone relays, a substantial amount of vibration or "pounding" is inherent in the normal operation of the device, the problem of breakage at this terminal point becomes particularly troublesome.

An object of the present invention is to reduce the failure in service of electrical coils.

A more specific object of the invention is to eliminate breakage of the lead-out wires of electrical coils.

In the past, when hand-wound coils were the type most commonly used, several fairly successful methods were practiced whereby additional strands of wire were wound in with the lead-out wires for the purpose of reenforcement. In more recent years, however, it has been the general practice to produce electrical coils by so-called automatic winding machines. Here several coils are wound at the same time, from several supply spools in the form of a "stick" and upon completion of the winding the stick is sliced into segments to produce the individual "filled" coils.

So far as applicant is aware, none of the prior methods of reenforcing lead-out wires, i. e., none until his invention, is applicable to the machine-wound, filled type of coil. The novel method and means of his invention, however, are readily and indeed particularly applicable to this type of coil and its production.

A feature of the present invention resides in the provision of reenforcing wires in the form of small preformed spirals through which the main wire is passed; these spirals are stretched out at the proper point in the winding whereby to closely engage the main wire and to form an integral, stranded lead-out wire of the reenforced type.

In one embodiment illustrative of the invention, a plurality of small spirals of stranded wire are positioned in specially designed guides or magazines of the winding machine with the respective magnet wires threaded through the associated group of helices. At the start and completion of each winding operation, a length, for example several inches, of each main wire is pulled out and sanded whereby to strip the insulating coating from the exposed length. The associated helix is then pulled out to stretch the turns along the sanded wire to obtain close engagement of the stranded wire and the main wire thereby producing an integral reenforced section. The stranded wire is then wound into place and the coil finished off.

A complete understanding of the arrangement contemplated by the present invention, the method of and apparatus for producing it, and the various valuable features embodied therein may be gained from consideration of the following detailed description and the attached drawings in which:

Fig. 4 is a view similar to that of Fig. 3 showing the stranded reenforcing wire applied to the magnet wire;

Fig. 5 is a similar view showing the reenforced wire partially wound into the coil;

Fig. 6 is a similar view showing the reenforced wire in position to be cut from the completed coil and attached to a coil being started on the arbor;

Fig. 7 is a similar view showing the remaining length of the reenforced lead being wound into the newly started coil;

Fig. 8 shows part of a "stick" of completed coils;

Fig. 9 is a view of a completed coil with reenforced lead wires;

Fig. 10 is a sectional view of one of the magazines "loaded" with a supply of spirals;

Fig. 11 is a view in partial section of the lower portion of the magazine with the manipulating tool indicated by dotted lines;

Fig. 12 is a view similar to that of Fig. 11 with two positions of the manipulating tool indicated by dotted lines; and Fig. 13 is a view similar to that of Fig. 10 with the reenforcing wire shown being pulled into final position.

Figure 1:
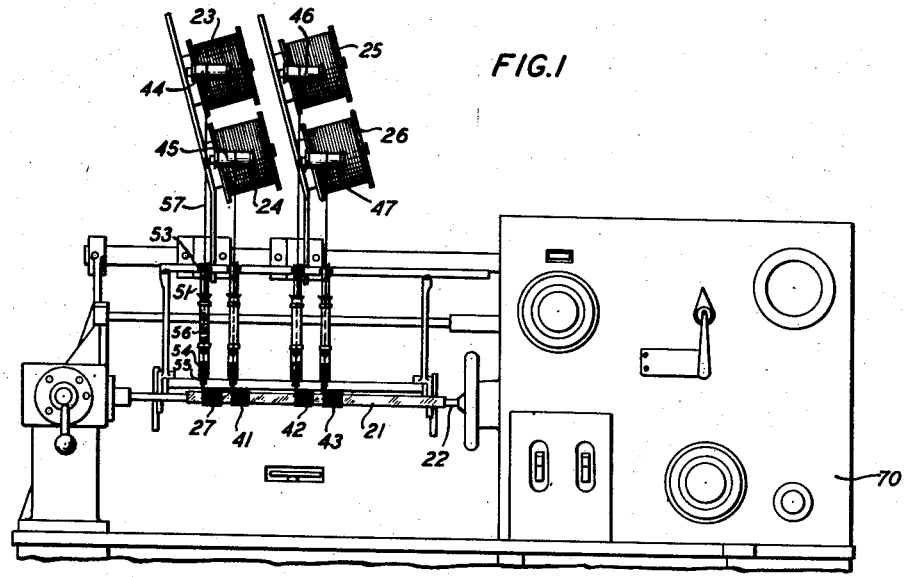
Fig. 1 is an elevational view of an automatic coil winding machine of a type in connection with which the method of the present invention may be practiced.

Referring now to the drawings and first to Fig. 1, an automatic coil winding machine is illustrated which may be, so far as the general features and operation are concerned, of the type well known in the art. A tube 21 of wrapping paper, cellulose acetate, or other suitable insulating material which serves as the core mandrel, or form of the "stick" and later as the core insulator when assembled into a coil, is mounted on machine arbor 22 which is rotated in the usual manner during the winding. A supply spool of magnet or winding wire (also referred to as "main" wire herein) is provided for each separate coil to be wound and is mounted in suitable position above the arbor; four of these supply spools 23, 24, 25 and 26 with corresponding, partially wound, coils 27, 41, 42 and 43 are illustrated. As the winding wire leaves the supply spool it passes over an idler pulley, pulleys 44, 45, 46 and 47 being illustrated.

The respective magnet wires after leaving the idler pulleys which include tensioning means, and before reaching the actual point of winding ordinarily are passed through a guiding device of suitable construction, and by means of a suitable traverse mechanism, not shown, all of these guiding devices are moved in unison back and forth in a horizontal direction whereby to apply the wire to the coils in even layers. Such tension means and traverse or reciprocating mechanisms are assumed to be present in the machine illustrated but need not be described in detail as each may be of a type well known in the art. The guiding mechanism itself however, embodies novel features contemplated by the invention and will now be described in detail.

Figure 2:
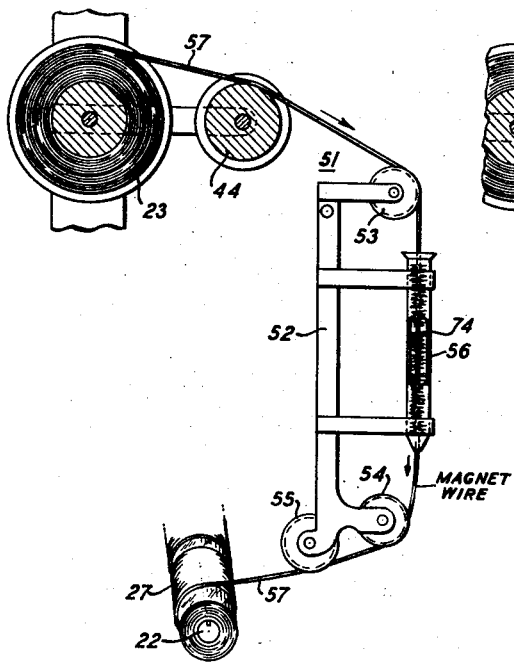
Fig. 2 is an enlarged view in partial section of portions of the machine of Fig. 1 showing one of the coils wound to a point just short of completion.

Each of the guiding mechanisms is of similar construction and the following description of guiding mechanism 51 may be considered typical of all four illustrated. Guiding mechanism 51 (Fig. 2) comprises a suitable frame 52 which supports, at its upper end, guide pulley 53 and, at its lower end, guide pulleys 54 and 55. It will be understood that frame 52 is attached to the traverse mechanism so that the entire guiding mechanism is moved back and forth horizontally during the winding operation.

Frame 52 also supports in a vertical position, and midway between the upper and lower guide pulleys, magazine 56. Magazine 56, which is generally similar in shape to an ordinary laboratory test tube, is cone shaped at its bottom end, a small aperture being provided at the apex of the cone. The upper end of magazine 56 is flared whereby to facilitate "loading" with the "spirals" of stranded wire as described in detail hereinafter.

Winding wire 57 after leaving supply spool 23 is passed over idler pulley 44 and guide pulley 53 into magazine 56, being threaded through the expanded spirals previously positioned therein, and passes out through the lower, apertured end of the magazine and over guide rollers 54 and 55 to the actual winding point.

As shown more clearly in Fig. 10, a rectangularly shaped aperture 71 is provided in the side wall of the lower end of magazine 56; this aperture permits entry of a manipulating tool in a manner and for a purpose that will be described in detail subsequently.

Power and control apparatus of the usual type may be positioned in casing 70.

Figure 3:
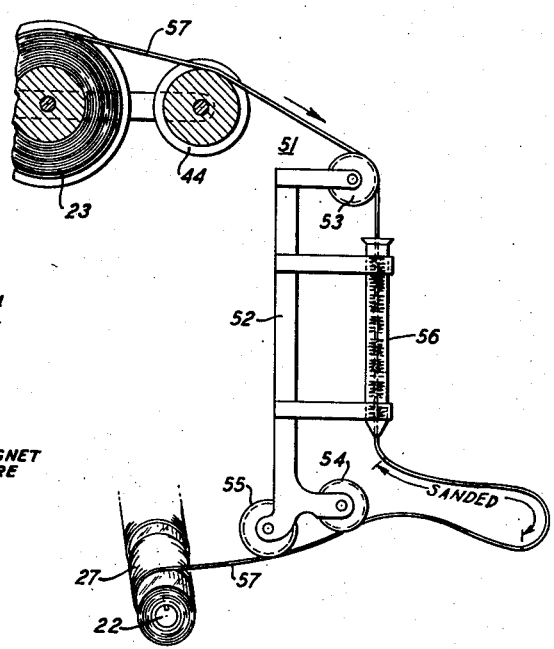
Fig. 3 is a view similar to that of Fig. 2 showing a portion of the magnet or winding wire pulled out to provide a slack loop to permit sanding.

As arbor 22 is rotated and the wire guides traverse back and forth, the respective coils are progressively wound in layer form, the machine providing for insulation between each layer by automatically feeding in one turn of cellulose acetate sheet (or other suitable material) per layer of winding. Assuming now that the winding of coil 27 and the other coils of the "stick" have reached a point just short of completion, i. e., the point where it is desired to start reenforcement of the lead-out wire, the winding machine is stopped and winding wire 57 is grasped by the operator and pulled out a sufficient distance to provide, as shown in Fig. 3, a free loop of several inches. (It will be understood that up to this point there has been no physical connection between winding wire 57 and the "spirals" with which magazine is loaded as the winding wire passes freely through the centers of the expanded spirals.) The free loop is now "sanded" or otherwise processed whereby to remove the enamel insulating coating therefrom in order to permit close electrical connection between the winding wire and the reenforcing wire subsequently applied.

After the free loop has been thoroughly cleaned of insulation and while the winding machine remains stopped, the operator inserts a suitable tool, here assumed to be specially designed tweezers 72, through aperture 71 of magazine 56 (Figs. 10 and 11) and grasps the lower end of spiral 73 which is the lowermost of the several spirals with which magazine 56 has been previously loaded. The lower end of spiral 73 is grasped by tool 72 and, by suitable manipulation thereof by the operator as indicated in Fig. 12, is pulled out through the small aperture provided in the apex of magazine 56, narrow slot 69 (Fig. 10) being provided to facilitate this operation. The downward pulling-out or stretching action is continued as shown in Fig. 13 until finally the entire spiral has been removed from the magazine; during this operation and due largely to the restraint imposed by the walls of the small aperture through which the spiral is pulled, the diameter thereof is decreased and the stranded wire of the spiral is forced into intimate spiraling engagement with the sanded loop of winding wire 57 whereby to result in a length of reenforced composite conductor comprising the magnet wire as a core with the stranded wire spiraled therearound in close contact.

As spiral 73 is pulled out of magazine 56, the remaining spirals in the magazine drop down correspondingly so that when spiral 73 has been entirely withdrawn the next lower spiral 74 is then left in position in magazine 56 for the next operation.

The size of the spirals when expanded, their length, and other details of their make-up, will of course, be varied as indicated by varying situations. By way of illustration, each spiral may comprise approximately 10 turns of stranded wire (such as four twisted strands of No. 26 bare tinned copper wire) wound into a helix of ⅛ inch inside diameter and reaching a length when "pulled-out" of about four inches.

Referring now to Fig. 4, magnet wire 57 is shown after the length (several inches) of the reenforcing wire 73 has been applied to the sanded portion. The winding operation is now resumed and several turns of the reenforced lead-out portion are wound onto coil 27 as shown in Fig. 5. After the first or second turn of the reenforced conductor has been wound in adhesive anchoring strip 75 may be applied to the stick in the general manner disclosed in Patent 2,460,555 issued to me February 1, 1949.

Now, as shown in Fig. 6, the completed "stick" of coils is removed from the arbor but, before the winding wire is cut, a portion of the as yet unused length of the composite reenforced wire is anchored by adhesive strip 76 to the form or mandrel of the coil next to be wound, which form or mandrel is now in position on the arbor. Winding wire 57 is then cut at the point indicated in Fig. 6 to "free" the completed stick and the remaining portion of the reenforced lead is then "wound into" the new coil as shown in Fig. 7. This portion will then become the inner lead-out wire for the new coil while, at the completion of the winding, the next spiral 74 will be pulled out in the manner described above whereby to provide the outer lead-out wire therefor.

The completed stick of coils (Fig. 8) may be sawed at the points indicated by the broken vertical lines to produce the individual coils. A completed coil of the type contemplated by the present invention is shown in Fig. 9 with reenforced inner lead-out wire 81 and anchoring strip 82 and reenforced outer lead-out wire 83 and anchoring strip 84. The coil may be provided with an outer covering 85 of cellulose acetate sheet or other suitable material.

It will be understood that the steps described above in connection with the winding of coil 27 are performed in the same manner and at the same point in the winding operation with respect to the other coils 41, 42, and 43 of the stick. A particularly advantageous feature of the method contemplated by the present invention resides in its adaptability to the automatic machine winding process. The number of manual steps required are slight, simple, and all are performed within a comparatively short overall time for all the individual coils thereby not tying up the expensive machine operation for any appreciable time. The advantages resulting from the provision of reenforced lead-out wires are of course obvious from the standpoint of reduced breakage and, further, may in many cases as in relays result in reduced cost by rendering feasible the direct connection of the lead to the spring pileups to the exclusion of coil terminal spool-heads usually considered necessary when the weaker non-reenforced lead-out wires are relied upon.

While certain specific embodiments of the invention have been selected for detailed description, the invention is not of course limited in its application to such embodiments. The embodiments described should be taken as illustrative of the invention and not as restrictive thereof.

What is claimed is:

1. A method of winding a plurality of electrical coils with magnet wire which includes the steps of threading the magnet wire through the center of an expanded spiral of reenforcing bare wire, winding a plurality of turns of said magnet wire on a first core, selecting a definite free portion of the magnet wire, stretching out the spiral whereby to simultaneously elongate and reduce the diameter of the spiral thereby resulting in intimate spiralled contact of the reenforcing wire with the external surface of the selected length of magnet wire, winding a portion of the resulting composite conductor on said first core, anchoring the wound portion on said core, winding substantially the remaining portion of the composite conductor on a second core, anchoring the second portion on said second core, and severing the composite conductor between said first and second core.

2. A method of producing integral, reenforced, lead-out conductors for a plurality of electrical coils wound with magnet wire which includes the steps of threading the magnet wire through the centers of a plurality of superimposed, expanded spirals of reenforcing bare wire, winding a plurality of turns of the magnet wire on a first coil form, selecting a definite free portion of the magnet wire, stretching out the first of said spirals whereby to simultaneously elongate and reduce the diameter of the spiral thereby resulting in intimate spiralled contact of the reenforcing wire with the external surface of the selected length of magnet wire, winding a portion of the resulting composite conductor on said first coil form, anchoring the wound portion on said form, winding substantially the remaining portion of the composite conductor on a second coil form, anchoring the second portion on said second coil form, severing the composite conductor between said first and said second coil forms, winding a plurality of additional turns comprising continuing lengths of the magnet wire on said second coil form, selecting a second definite free portion of the magnet wire, stretching out the second of said spirals whereby to simultaneously elongate and reduce the diameter thereof thereby resulting in intimate spiralled contact of the wire of said second spiral and the external surface of said second length of magnet wire, winding a portion of the resulting composite conductor on said second coil form, anchoring the wound portion on said second coil form, and severing the unwound portion of the composite conductor.

References Cited in the file of this patent

UNITED STATES PATENTS

| Number | Name | Date |
|---|---|---|
| 648,446 | Varley | May 1, 1900 |
| 1,713,941 | Adams et al. | May 21, 1929 |
| 1,764,592 | Adams | June 17, 1930 |
| 1,873,122 | Hartzell | Aug. 23, 1932 |
| 2,038,297 | Ketcham | Apr. 21, 1936 |
| 2,107,810 | Wherry | Feb. 8, 1938 |
| 2,334,880 | Marlow | Nov. 23, 1943 |
| 2,396,795 | Lea | Mar. 19, 1946 |
| 2,398,217 | Frankwich | Apr. 9, 1946 |
| 2,442,446 | Wallace | June 1, 1948 |
| 2,452,474 | Kitselman | Oct. 26, 1948 |
| 2,471,777 | Reinartz | May 31, 1949 |
| 2,484,212 | Ferris et al. | Oct. 11, 1949 |